UNITED STATES PATENT OFFICE 2,433,299

BLOOD COAGULANT AND METHOD OF PRESERVING SAME

Walter H. Seegers, Detroit, Mich., assignor to Parke, Davis & Company, Detroit, Mich., a corporation of Michigan No Drawing. Application January 22, 1944, Serial No. 519,409

16 Claims. (Cl. 195—62)

The invention relates to stabilized preparations of thrombin. More particularly the invention has to do with aqueous solutions of the blood coagulant, thrombin, which are sufficiently stable and retain their thrombin activity for a period of time long enough to permit of their practical use in the clinic and in the field.

It is known that preparations containing thrombin activity can be kept for relatively long periods when in a thoroughly dry state, but that they quickly lose their activity in the presence of water or moisture. This sensitivity to destruction by moisture is so great that when dry thrombin preparations are removed from their air-tight containers and taken up in water to form a blood coagulating solution, the solutions must be used on the same day they are prepared, lest the activity disappear completely. For this reason, it has heretofore not been possible to prepare stable solutions of thrombin for the market. Hence, it has been necessary that the physician or surgeon interrupt his work, for example on a bleeding patient, to make up a coagulant solution from a dry preparation just prior to the moment when he needs it. Manifestly, it is highly desirable that a product be made available which already exists as an aqueous solution retaining high coagulating efficacy for long periods of time so that it is available, preferably as a stock solution, for direct use, or after simple dilution, some time prior to the moment when one expects it will be needed. It is also desirable that the stock solution have extraordinarily high activity so that it can be put up in small packages or containers and be considerably diluted before use and yet have high acivity in the diluted condition.

I have found that purified and antithrombin-free thrombin preparations can be dissolved in water along with certain simple carbohydrate compounds to give thrombin solutions which remain effective for a period of months, whereas such purified thrombin when dissolved in water alone gives solutions which lose all of their blood coagulating power after a day or so.

The simple carbohydrate compounds which I use as stabilizers are compounds of the class pentoses, hexoses, hexose disaccharides and methyl and ethyl glycosides of pentoses and hexoses.

I have also found, by incorporating said simple carbohydrate compounds into aqueous solutions with thrombin preparations which are not antithrombin-free (even though they may otherwise be considerably purified and may contain only very small amounts of antithrombins), that the resulting solutions lose their blood coagulating power within the short space of a few minutes. It is therefore impossible to obtain a practical solution of thrombin containing the carbohydrate, if the thrombin contains antithrombins. To obtain a practical, safe, commercial product, the thrombin used must be antithrombin-free.

"Antithrombin-free" thrombin preparations as used herein are intended to include highly purified preparations such as those described in copending application of Harry P. Smith, Serial No. 332,397, filed April 29, 1940, Patent #2,398,077.

The following examples serve to illustrate the invention.

Example 1

1 gram of antithrombin-free thrombin is dissolved in 100 ml. of 66% pure sucrose solution. The antithrombin-free thrombin used is obtained for example as described in copending application of H. P. Smith, Serial No. 332,397, filed April 29, 1940. The sucrose solution of thrombin is then sterilized by filtration through a Berkfeld filter. The filtrate is preferably put into rubber capped stock solution containers and stored in a refrigerator until ready for use. When it is desired to use this product, the surgeon can insert a hypodermic needle through the rubber cap below the level of the solution and withdraw into the barrel of the hypodermic syringe a charge of say 1 ml. of the stock solution. Thereafter, he draws into the syringe 9 ml. of sterile isotonic saline solution and thereby forms 10 ml. of a saline solution of diluted thrombin of very high coagulating power which can be sprayed or otherwise applied to bleeding tissues.

The solution prepared by this example is still highly active and has not decreased in coagulating power after twelve months storage in the ice-box. It can be diluted and used as described above. After this period of storage, and even when diluted as much as a hundred times, it is a powerful blood coagulant and acts to coagulate blood or plasma almost instantaneously or at least within a few seconds, depending upon the degree of dilution.

Example 2

1.2 grams of antithrombin-free thrombin is dissolved in 110 ml. of a 40% aqueous solution of β-methyl-d-glucoside made by dissolving 40 parts by weight of the glycoside in 60 ml. of water. After sterilization by filtration, a stabilized stock solution results and can then be filled into containers and marketed for use. The product has an effectiveness and stability comparable to the product of Example 1.

Instead of using β-methyl-d-glucoside in this example, one can obtain about the same results by using α-methyl-d-glucoside in 40 or 45% concentration.

*Example 3*

0.5 gram of antithrombin-free thrombin is dissolved in 50 ml. of a solution of 380 grams of d-fructose in 620 ml. of water. The solution is thereby stabilized against loss of thrombin activity and can be sterilized and put into containers for use as described for the products of Examples 1 and 2.

Instead of using d-fructose (levulose) in this example, other hexoses, aldohexoses as well as ketohexoses, can be used. For example, one can use d-glucose or d-galactose or l-mannose.

The various pentoses can likewise be used as stabilizers of thrombin solutions, such as d-xylose and l-arabinose.

The glycosidic stabilizers of the invention have been found to be especially effective. Included in this class are compounds such as lactose, maltose, sucrose, α-methyl-d-glucoside β-methyl-d-glucoside, β-methyl-d-xyloside, β-methyl-l-xyloside, α-methyl xyloside, α-methyl-d-galacto-pyranoside, β-methyl-d-galactopyranoside, β-ethyl-d-galactofuranoside, ethyl lactoside and β-lactose octa acetate.

The preferred compounds for use as stabilizers are the glycosidic members of the class of simple carbohydrate compounds described above. The hexose disaccharides are included among the glycosidic members because they contain the glycosidic linkage,

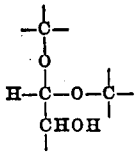

In general, the more of a given stabilizer that can be put into solution, the more effective the stabilization. For example, I have found that those stabilizers of my invention having a solubility in water of at least about 40% by weight are the most effective.

The preferred concentrations of the stabilizing compounds which I use in my stabilized thrombin solutions are those which, for a given stabilizer, are as near saturation as possible without at the same time risking that the solution will become supersaturated or crystallize out, or deposit the stabilizer in any kind of solid form, upon long standing or when chilled to low temperatures or under both of these conditions. Satisfactory concentrations can easily be determined for any particular stabilizer by making up various concentrations and subjecting the solutions to various temperatures over considerable periods of time, for example for several months or for a year, and then observing the solution to determine if any of the stabilizer has come out of solution. The behavior of a given stabilizer can often be determined for practical purposes by this test, without using any thrombin in the aqueous solution or, in some cases, one needs only to consult the published literature concerning the solubility behavior to know what is a safe and optimum concentration to use.

Variations coming within the scope of the invention consist in the use of the stabilizers in various combinations and proportions. Moreover, the invention includes perfectly dry mixtures of antithrombin-free thrombin with proportions of stabilizers, used singly or in combinations, which will stabilize the solutions which are formed when water is subsequently added to dissolve the mixture. In this way, and by sealing the dry mixtures in water and moisture proof containers, it is possible to provide a commercial product capable of use by the physician or surgeon for the pupose of making up his own stock solution at a time most convenient for his own purposes. For instance, the stabilized solutions given in the above examples can be frozen and then dried under a vacuum from the frozen state by any of the known drying methods which avoid heating the mixture to temperatures likely to damage the thrombin activity.

What I claim as my invention is:

1. An aqueous solution of antithrombin-free thrombin and at least one stabilizing compound of the class consisting of pentoses, hexoses, hexose disaccharides and methyl and ethyl glycosides of pentoses and hexoses having a solubility of at least about 40 per cent by weight in water, the proportion of said stabilizing compounds in the solution being sufficient for them to remain in solution and be in the neighborhood of saturation.

2. An aqueous solution of antithrombin-free thrombin and sucrose, the proportion of water to sucrose being such as to retain the sucrose in solution and near saturation.

3. An aqueous solution of a relatively small quantity of antithrombin-free thrombin containing about 65 per cent by weight of sucrose.

4. Method for obtaining a blood coagulating combination which comprises incorporating with antithrombin-free thrombin in aqueous solution at least one stabilizing compound for the thrombin of the class consisting of pentoses, hexoses, hexose disaccharides, and methyl and ethyl glycosides of pentoses and hexoses, said stabilizing compounds having a solubility of at least about 40% by weight in water and being present in amounts sufficient to give a solution in the neighborhood of saturation.

5. Method for obtaining a blood coagulating combination which comprises incorporating with antithrombin-free thrombin in aqueous solution at least one stabilizing compound for the thrombin of the class consisting of pentoses, hexoses, hexose disaccharides, and methyl and ethyl glycosides of pentoses and hexoses, said stabilizing compounds being present in amounts sufficient to completely retain the combination in solution and give a solution of stabilizing compounds in the neighborhood of saturation.

6. Method for obtaining a blood coagulating combination which comprises incorporating with antithrombin-free thrombin in aqueous solution an amount of sucrose sufficient to give an aqueous solution thereof having a concentration above about 60%.

7. An aqueous solution of antithrombin-free thrombin and a hexose disaccharides having a solubility of at least about 40% by weight in water, the proportion of water to said hexose disaccharide being such as to retain said hexose disaccharide in solution and near saturation.

8. An aqueous solution of antithrombin-free thrombin and a methyl glycoside of a hexose having a solubility of at least about 40% by weight in water, the proportion of water to said methyl glycoside of a hexose being such as to retain said methyl glycoside of a hexose in solution and near saturation.

9. An aqueous solution of antithrombin-free thrombin and α-methyl-d-glucoside, the proportion of water to α-methyl-d-glucoside being such as to retain α-methyl-d-glucoside in solution and near saturation.

10. An aqueous solution of antithrombin-free thrombin and a hexose monosaccharide having a solubility of at least about 40% by weight in water, the proportion of water to said hexose monosaccharide being such as to retain said hexose monosaccharide in solution and near saturation.

11. An aqueous solution of antithrombin-free thrombin and d-glucose, the proportion of water to d-glucose being such as to retain d-glucose in solution and near saturation.

12. Method for obtaining a blood coagulating combination which comprises incorporating with antithrombin-free thrombin in aqueous solution an amount of a hexose disaccharide sufficient to completely retain the combination in solution and give a solution of said hexose disaccharide in the neighborhood of saturation.

13. Method for obtaining a blood coagulating combination which comprises incorporating with antithrombin-free thrombin in aqueous solution an amount of a methyl glycoside of a hexose sufficient to completely retain the combination in solution and give a solution of said methyl glycoside of a hexose in the neighborhood of saturation.

14. Method for obtaining a blood coagulating combination which comprises incorporating with antithrombin-free thrombin in aqueous solution an amount of α-methyl-d-glucoside sufficient to completely retain the combination in solution and give a solution of α-methyl-d-glucoside in the neighborhood of saturation.

15. Method for obtaining a blood coagulating combination which comprises incorporating with antithrombin-free thrombin in aqueous solution an amount of a hexose monosaccharide sufficient to completely retain the combination in solution and give a solution of said hexose monosaccharide in the neighborhood of saturation.

16. Method for obtaining a blood coagulating combination which comprises incorporating with antithrombin-free thrombin in aqueous solution an amount of d-glucose sufficient to completely retain the combination in solution and give a solution of d-glucose in the neighborhood of saturation.

WALTER H. SEEGERS.

REFERENCES CITED

The following references are of record in the file of this patent:

UNITED STATES PATENTS

| Number | Name | Date |
| --- | --- | --- |
| 1,855,591 | Wallerstein | Apr. 26, 1932 |
| 1,855,592 | Wallerstein | Apr. 26, 1932 |

OTHER REFERENCES

Chemical Abstract 26: 5585 (5), Deterioration of Fibrinogen and Thrombin, J. O. Wakelin Barratt. J. Physiol. 75, 428-32 (1932).